(12) United States Patent
Chang et al.

(10) Patent No.: US 7,944,090 B2
(45) Date of Patent: May 17, 2011

(54) MULTI-OUTPUT POWER CONVERSION CIRCUIT

(75) Inventors: Shih-Hsien Chang, Taoyuan Hsien (TW); Po-Nien Ko, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 295 days.

(21) Appl. No.: 12/414,507

(22) Filed: Mar. 30, 2009

(65) Prior Publication Data
US 2010/0133905 A1    Jun. 3, 2010

(30) Foreign Application Priority Data
Dec. 2, 2008    (TW) .............................. 97146825 A

(51) Int. Cl.
*H02J 1/10* (2006.01)
(52) U.S. Cl. ......................................................... 307/72
(58) Field of Classification Search ...................... 307/72
See application file for complete search history.

(56) References Cited

U.S. PATENT DOCUMENTS

| | | | | |
|---|---|---|---|---|
| 5,754,416 A | * | 5/1998 | Lim et al. ................... | 363/21.03 |
| 5,998,979 A | * | 12/1999 | Nilsson ......................... | 323/273 |
| 7,696,733 B2 | * | 4/2010 | Osaka ........................... | 323/267 |
| 7,839,668 B2 | * | 11/2010 | Wong et al. .................. | 363/144 |
| 7,884,496 B2 | * | 2/2011 | Li et al. ........................ | 307/31 |

* cited by examiner

*Primary Examiner* — Albert W Paladini
(74) *Attorney, Agent, or Firm* — Kirton & McConkie; Evan R. Witt

(57) ABSTRACT

A multi-output power conversion circuit is provided for converting an input voltage into a standby voltage and a first output voltage. The multi-output power conversion circuit includes a transformer, a power switching circuit, a first rectifier-filter circuit, a second rectifier-filter circuit, a first switching circuit, a voltage-adjusting circuit, a feedback circuit and a power control circuit. The feedback circuit is connected to the first rectifier-filter circuit, the second rectifier-filter circuit and the system circuit. The feedback circuit generates a feedback voltage according to a power-status signal issued by the system circuit. The power control circuit is interconnected between the power switching circuit and the feedback circuit for controlling on/off statuses of the power switching circuit according to the feedback voltage. The feedback circuit generates the feedback voltage according to the power-status signal and selectively according to the first DC voltage or the second DC voltage.

20 Claims, 9 Drawing Sheets

MULTI-OUTPUT POWER CONVERSION CIRCUIT

FIELD OF THE INVENTION

The present invention relates to a power conversion circuit, and more particularly to a multi-output power conversion circuit.

BACKGROUND OF THE INVENTION

With increasing industrial development, diverse electronic appliances are used to achieve various purposes. An electronic appliance comprises a plurality of electronic components. Generally, different kinds of electronic components are operated by using different voltages.

As known, a power supply is essential for many electronic appliances such as personal computers, industrial computers, servers, communication products or network products. Usually, the user may simply plug a power supply into an AC wall outlet commonly found in most homes or offices so as to receive an AC voltage. The power supply will convert the AC voltage into different regulated DC output voltages for powering the electronic components contained in the electronic appliance. For example, the common DC output voltages include 12, 5 and 3.3 volts.

Conventionally, an electronic appliance has a mechanic switch element that is connected to a power conversion circuit. By switching the mechanic switch element, the output voltage of the power conversion circuit is selectively enabled or disabled and thus the electronic appliance is selectively enabled or disabled. For most electronic appliances, the power conversion circuit needs to offer a standby voltage to certain low-power circuit when the electronic appliance is powered off. The standby voltage is employed to achieve a certain function such as power status indication, time indication, data indication, an alarm clock function, subscription to initiation or remote control. In other words, the power conversion circuit outputs a first DC voltage and the standby voltage when the electronic appliance is powered on; and the power conversion circuit outputs the standby voltage when the electronic appliance is powered off.

Generally, the conventional power conversion circuit has two circuit loops for respectively outputting the first output voltage and the standby voltage. When the electronic appliance is powered on, the power conversion circuit simultaneously outputs the first DC voltage and the standby voltage. When the electronic appliance is powered off, the power conversion circuit only outputs the standby voltage to implement certain functions. Since the uses of two circuit loops need two transformers and two power control circuit, the overall volume of the power conversion circuit is bulky and the power density is insufficient. In addition, the power conversion circuit is not cost-effective.

There is a need of a providing a multi-output power conversion circuit to obviate the drawbacks encountered from the prior art.

SUMMARY OF THE INVENTION

It is an object of the present invention to provide a multi-output power conversion circuit with reduced power loss and increased operating efficiency.

Another object of the present invention provides a multi-output power conversion circuit with reduced overall volume and increased power density.

In accordance with an aspect of the present invention, there is provided a multi-output power conversion circuit for converting an input voltage into a standby voltage and a first output voltage. The standby voltage and the first output voltage are transmitted to a system circuit through a first output terminal and a second output terminal, respectively. The multi-output power conversion circuit includes a transformer, a power switching circuit, a first rectifier-filter circuit, a second rectifier-filter circuit, a first switching circuit, a voltage-adjusting circuit, a feedback circuit and a power control circuit. The transformer includes a primary winding assembly, a first secondary winding assembly and a second secondary winding assembly. The power switching circuit is connected to the primary winding assembly of the transformer and a common terminal. The first rectifier-filter circuit is connected to the first secondary winding assembly of the transformer for rectification and filtering off noise, thereby generating a first DC voltage. The second rectifier-filter circuit is connected to the second secondary winding assembly of the transformer for rectification and filtering off noise, thereby generating a second DC voltage. The first switching circuit is interconnected between the second rectifier-filter circuit and the second output terminal of the multi-output power conversion circuit. The voltage-adjusting circuit is interconnected between the first rectifier-filter circuit and the first output terminal of the multi-output power conversion circuit. The feedback circuit is connected to the first rectifier-filter circuit, the second rectifier-filter circuit and the system circuit. The feedback circuit generates a feedback voltage according to a power-status signal issued by the system circuit. The power control circuit is interconnected between the power switching circuit and the feedback circuit for controlling on/off statuses of the power switching circuit according to the feedback voltage. The feedback circuit generates the feedback voltage according to the power-status signal and selectively according to the first DC voltage or the second DC voltage.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
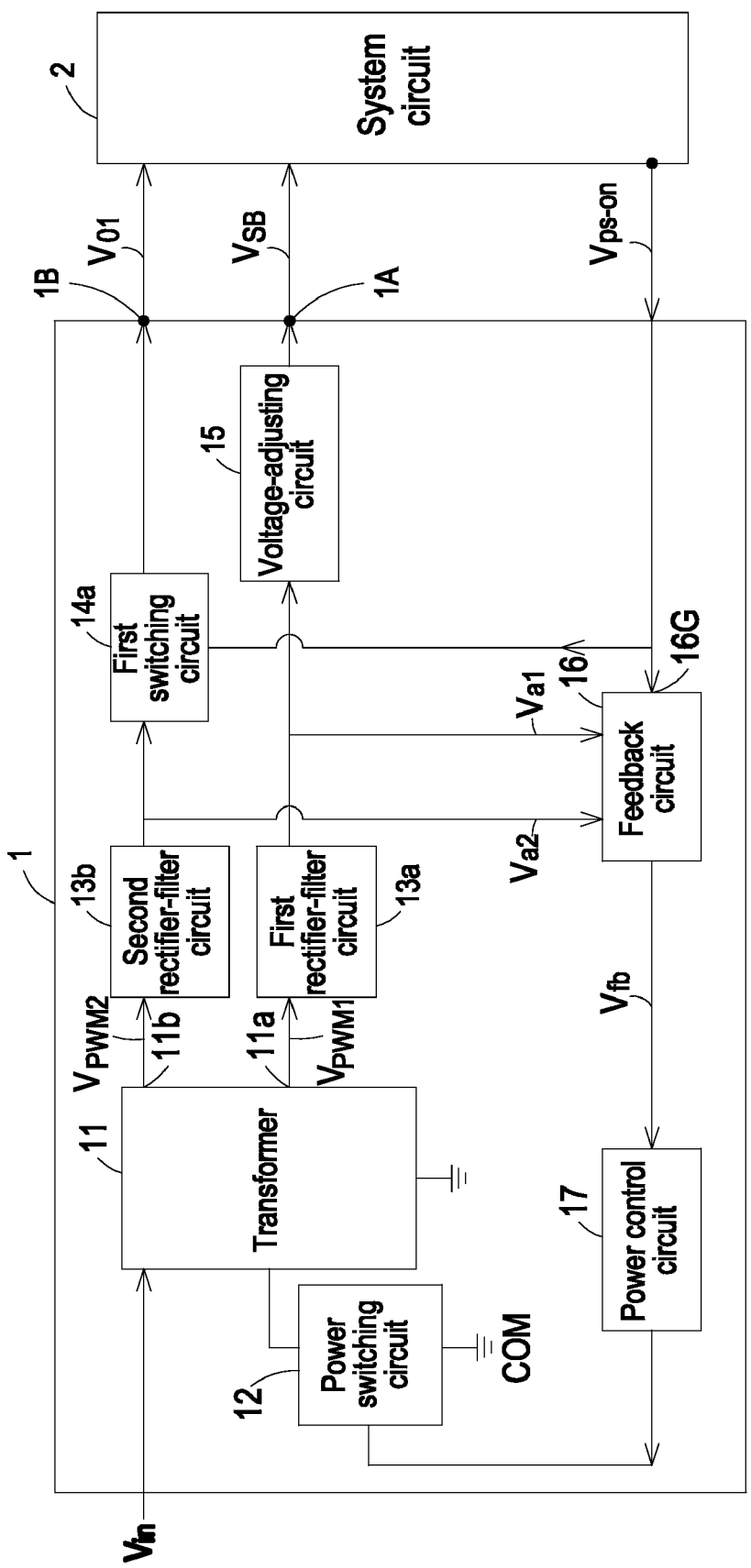
FIG. 1A is a schematic circuit block diagram illustrating a multi-output power conversion circuit according to a first preferred embodiment of the present invention.

FIG. 1A is a schematic circuit block diagram illustrating a multi-output power conversion circuit according to a first preferred embodiment of the present invention. As shown in FIG. 1A, the power conversion circuit 1 principally comprises a transformer 11, a power switching circuit 12, a first rectifier-filter circuit 13a, a second rectifier-filter circuit 13b, a first switching circuit 14a, a voltage-adjusting circuit 15, a feedback circuit 16 and a power control circuit 17.

The transformer 11 comprises a primary winding assembly $N_p$, a first secondary winding assembly $N_{s1}$ and a second secondary winding assembly $N_{s2}$ (not shown). The first secondary winding assembly $N_{s1}$ and the second secondary winding assembly $N_{s2}$ are respectively connected to a first secondary connecting terminal 11a and a second secondary connecting terminal 11b of the transformer 11.

The power switching circuit 12 is connected to the primary winding assembly $N_p$ of the transformer 11 and a common terminal COM. By alternately conducting and shutting off the power switching circuit 12, the electric energy of the input voltage $V_{in}$ is received by the primary winding assembly $N_p$ and then magnetically transmitted to the first secondary winding assembly $N_{s1}$ and the second secondary winding assembly $N_{s2}$ of the transformer 11. As such, the first secondary winding assembly $N_{s1}$ and the second secondary winding assembly $N_{s2}$ of the transformer 11 generate a first pulse width modulation voltage $V_{PWM1}$ and a second pulse width modulation voltage $V_{PWM2}$, respectively.

The input terminal of the first rectifier-filter circuit 13a is connected to the first secondary connecting terminal 11a of the transformer 11. The output terminal of the first rectifier-filter circuit 13a is connected to the input terminal of the voltage-adjusting circuit 15. The first rectifier-filter circuit 13a is used for rectifying and filtering the first pulse width modulation voltage $V_{PWM1}$, thereby generating a first DC voltage $V_{a1}$ from the output terminal of the first rectifier-filter circuit 13a. The input terminal of the second rectifier-filter circuit 13b is connected to the second secondary connecting terminal 11b of the transformer 11. The output terminal of the second rectifier-filter circuit 13b is connected to input terminal of the first switching circuit 14a. The second rectifier-filter circuit 13b is used for rectifying and filtering the second pulse width modulation voltage $V_{PWM2}$, thereby generating a second DC voltage $V_{a2}$ from the output terminal of the second rectifier-filter circuit 13b.

The first switching circuit 14a is interconnected between the second rectifier-filter circuit 13b and the second output terminal 1B of the power conversion circuit 1. The control terminal of the first switching circuit 14a is connected to the system circuit 2. According to a power-status signal $V_{ps-on}$ issued by the system circuit 2, the first switching circuit 14a is conducted or shut off.

The voltage-adjusting circuit 15 is interconnected between the output terminal of the first rectifier-filter circuit 13a and the first output terminal 1A of the power conversion circuit 1. The voltage-adjusting circuit 15 is used for adjusting the magnitude of the first DC voltage $V_{a1}$ to a standby voltage $V_{SB}$ having an acceptable level.

The control terminal 16G of the feedback circuit 16 is connected to the system circuit 2. The feedback circuit 16 is also connected to the output terminal of the first rectifier-filter circuit 13a, the output terminal of the second rectifier-filter circuit 13b and the power control circuit 17. According to the power-status signal $V_{ps-on}$, the first DC voltage $V_{a1}$ and the second DC voltage $V_{a2}$, the feedback circuit 16 generates a feedback signal $V_{fb}$.

The power control circuit 17 is connected to the control terminal of the power switching circuit 12 and the feedback circuit 16. According to the feedback signal $V_{fb}$, the power control circuit 17 controls the on/off statuses of the power switching circuit 12. By alternately conducting and shutting off the power switching circuit 12 under control of the power control circuit 17, the electric energy of the input voltage $V_{in}$ is received by the primary winding assembly $N_p$ and then magnetically transmitted to the first secondary winding assembly $N_{s1}$ and the second secondary winding assembly $N_{s2}$ of the transformer 11. As such, the first secondary winding assembly $N_{s1}$ and the second secondary winding assembly $N_{s2}$ of the transformer 11 generate the first pulse width modulation voltage $V_{PWM1}$ and the second pulse width modulation voltage $V_{PWM2}$, respectively. An example of the power control circuit 17 includes but is not limited to a pulse width modulation (PWM) controller or a digital signal processor (DSP).

Please refer to FIG. 1A again. The first secondary winding assembly $N_{s1}$ and the second secondary winding assembly $N_{s2}$ of the transformer 11 generate the first pulse width modulation voltage $V_{PWM1}$ and the second pulse width modulation voltage $V_{PWM2}$, respectively. In accordance with a key feature of the present invention, the second pulse width modulation voltage $V_{PWM2}$ is larger than the first pulse width modulation voltage $V_{PWM1}$. As a consequence, the second DC voltage $V_{a2}$ is larger than the first DC voltage $V_{a1}$.

Figure 1B:
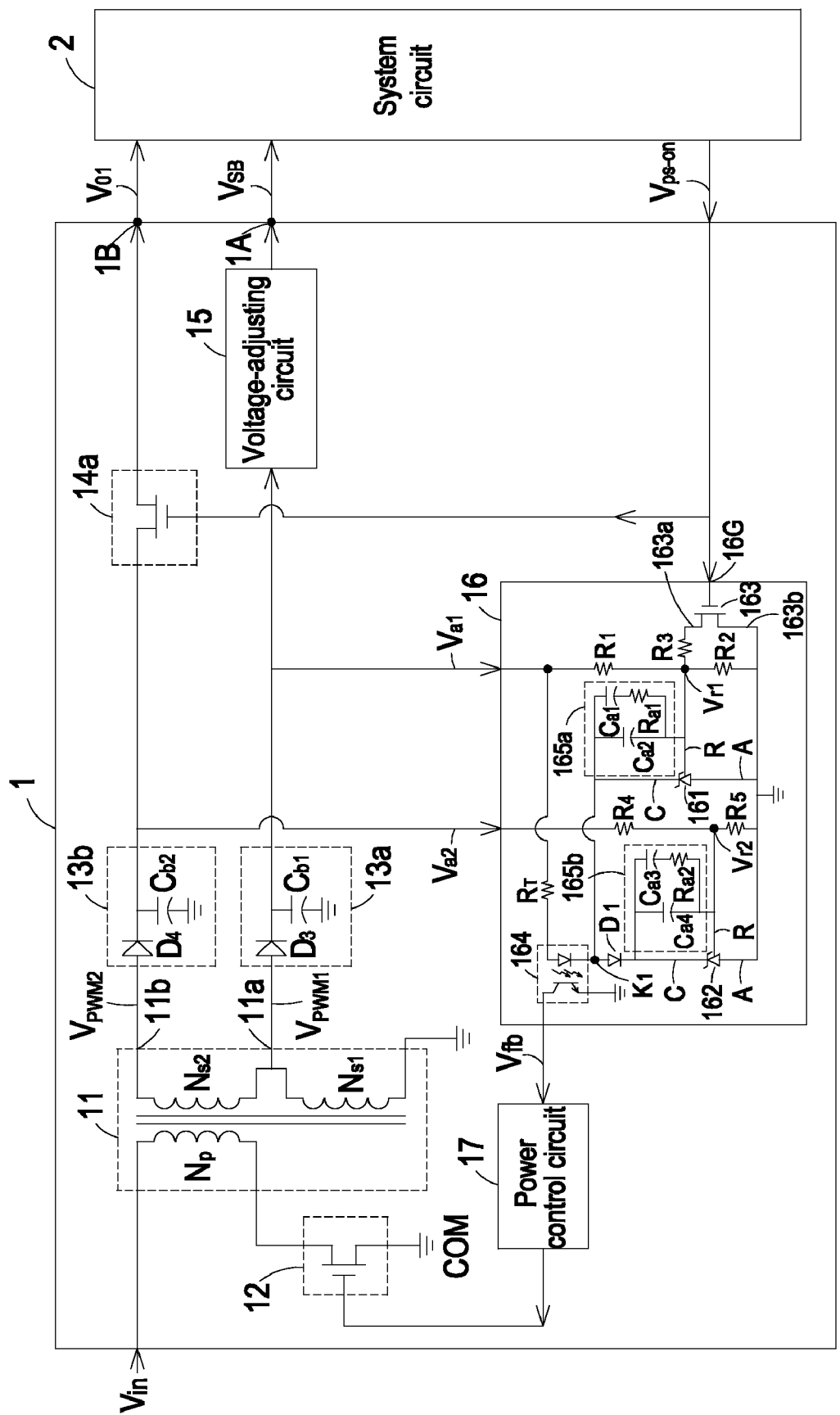
FIG. 1B is a schematic detailed circuit diagram illustrating an exemplary power conversion circuit shown in FIG. 1A.
Figure 1C:
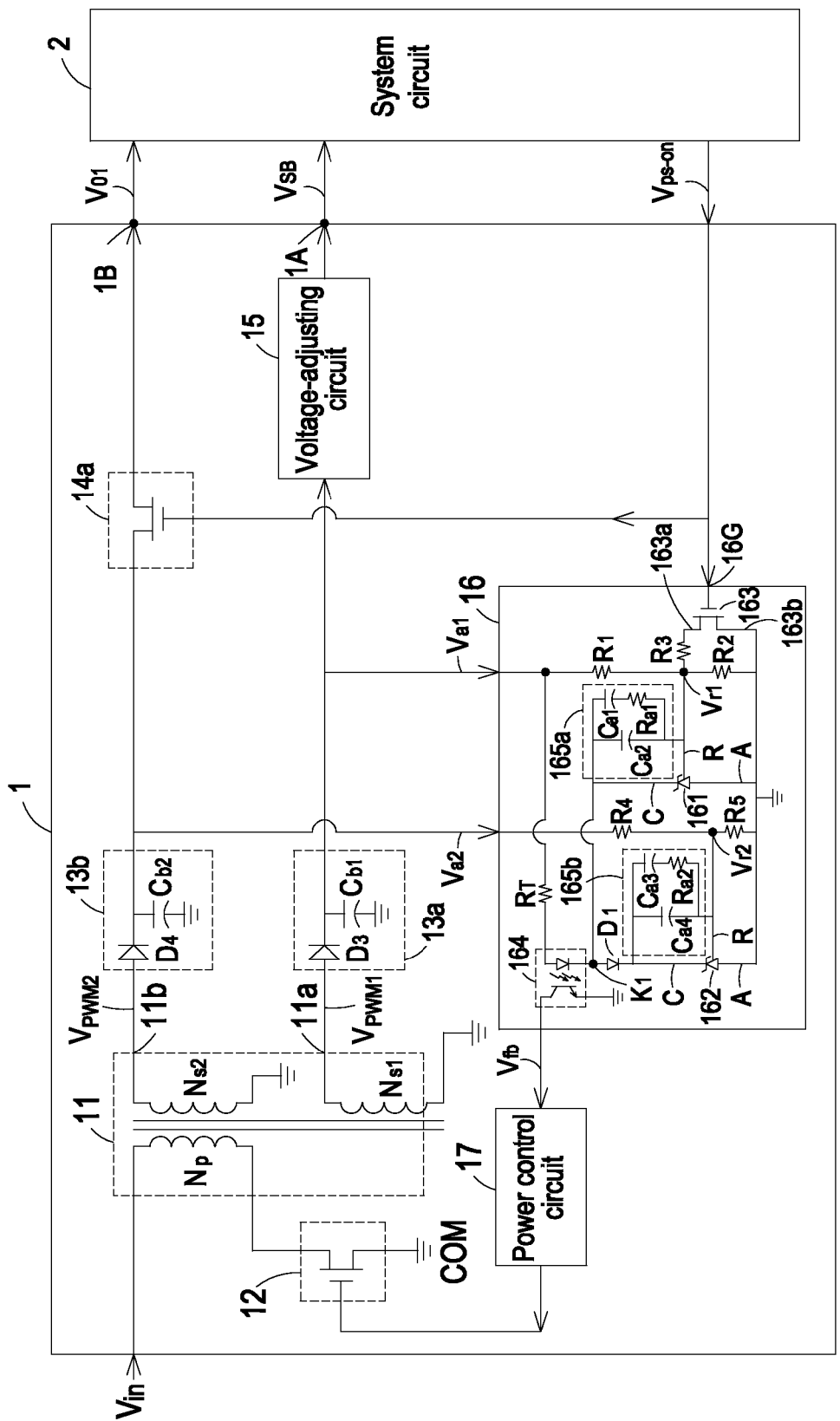
FIG. 1C is a schematic detailed circuit diagram illustrating another exemplary power conversion circuit shown in FIG. 1A.

FIG. 1B is a schematic detailed circuit diagram illustrating an exemplary power conversion circuit shown in FIG. 1A. FIG. 1C is a schematic detailed circuit diagram illustrating another exemplary power conversion circuit shown in FIG. 1A. The secondary sides of the transformers of FIG. 1B and FIG. 1C are distinguishable.

As shown in FIG. 1B, the transformer 11 comprises a primary winding assembly $N_p$, a first secondary winding assembly $N_{s1}$ and a second secondary winding assembly $N_{s2}$. The first secondary winding assembly $N_{s1}$ and the second secondary winding assembly $N_{s2}$ are connected with each other in series. The magnitude of the second pulse width modulation voltage $V_{PWM2}$ is equal to the voltage difference across both ends of the first secondary winding assembly $N_{s1}$ plus the voltage difference across both ends of the second secondary winding assembly $N_{s2}$. The magnitude of the first pulse width modulation voltage $V_{PWM1}$ is equal to the voltage difference across both ends of the first secondary winding assembly $N_{s1}$. In other words, the second pulse width modulation voltage $V_{PWM2}$ is larger than the first pulse width modulation voltage $V_{PWM1}$, and the second DC voltage $V_{a2}$ is larger than the first DC voltage $V_{a1}$.

As shown in FIG. 1C, the transformer 11 also comprises a primary winding assembly $N_p$, a first secondary winding assembly $N_{s1}$ and a second secondary winding assembly $N_{s2}$. In comparison with FIG. 1B, the first secondary winding assembly $N_{s1}$ and the second secondary winding assembly $N_{s2}$ are not connected with each other in series. The magnitude of the first pulse width modulation voltage $V_{PWM1}$ is equal to the voltage difference across both ends of the first secondary winding assembly $N_{s1}$. The magnitude of the second pulse width modulation voltage $V_{PWM2}$ is equal to the voltage difference across both ends of the second secondary winding assembly $N_{s2}$. In this embodiment, since the coil turn of the first secondary winding assembly $N_{s1}$ is larger than that of the second secondary winding assembly $N_{s2}$, the turn ratio of the first secondary winding assembly $N_{s1}$ to the primary winding assembly $N_p$ is larger than the turn ratio of the second secondary winding assembly $N_{s2}$ to the primary winding assembly $N_p$. In other words, the second pulse width modulation voltage $V_{PWM2}$ is larger than the first pulse width modulation voltage $V_{PWM1}$, and the second DC voltage $V_{a2}$ is larger than the first DC voltage $V_{a1}$.

The operation principles of the power conversion circuit shown in FIG. 1B are similar to those of the power conversion circuit shown in FIG. 1C. Hereinafter, the operations of the power conversion circuit shown in FIG. 1B is illustrated. Please refer to FIG. 1B again. The feedback circuit 16 comprises a first three-terminal adjustable voltage regulator 161 (e.g. a TI TL1431 IC), a second three-terminal adjustable voltage regulator 162, a first switch element 163, a first rectifier diode $D_1$, an opto-isolator 164, a current-limiting resistor $R_T$, a first resistor $R_1$, a second resistor $R_2$, a third resistor $R_3$, a fourth resistor $R_4$ and a fifth resistor $R_5$. An end of the current-limiting resistor $R_T$ is connected to the output terminal of the first rectifier-filter circuit 13a. The other end of the current-limiting resistor $R_T$ is connected to the input terminal of the opto-isolator 164. In other words, the current-limiting resistor $R_T$ and the opto-isolator 164 are serially connected between the output terminal of the first rectifier-filter circuit 13a and a first connecting node $K_1$. The current-limiting resistor $R_T$ is used for limiting the magnitude of the current inputted into the input terminal of the opto-isolator 164. In some embodiment, the locations of the opto-isolator 164 and the current-limiting resistor $R_T$ are exchanged. That is, the current-limiting resistor $R_T$ and the opto-isolator 164 are also serially connected between the output terminal of the first rectifier-filter circuit 13a and a first connecting node $K_1$, thereby limiting the magnitude of the current inputted into the input terminal of the opto-isolator 164.

An end of the first resistor $R_1$ is connected to the output terminal of the first rectifier-filter circuit 13a. The other end of the first resistor $R_1$ is connected to a reference terminal R of the first three-terminal adjustable voltage regulator 161.

An end of the second resistor $R_2$ is also connected to the reference terminal R of the first three-terminal adjustable voltage regulator 161. The other end of the second resistor $R_2$ is connected to the common terminal COM. That is, the first resistor $R_1$ and the second resistor $R_2$ are serially connected to the reference terminal R of the first three-terminal adjustable voltage regulator 161. The first DC voltage $V_{a1}$ is subject to voltage division by the serially-connected components $R_1$ and $R_2$, thereby generating a first divided voltage $V_{r1}$.

A first terminal 163a of the first switch element 163 is connected to the third resistor $R_3$. A second terminal 163b of the first switch element 163 is connected to the common terminal COM. That is, the first switch element 163 and the third resistor $R_3$ are connected with each other in series. The control terminal of the first switch element 163 is connected to the system circuit 2 through the control terminal 16G of the feedback circuit 16. According to the power-status signal $V_{ps-on}$ issued by the system circuit 2, the first switch element 163 is conducted or shut off.

The third resistor $R_3$ and the first switch element 163 are serially connected between both ends of the second resistor $R_2$. In a case that the first switch element 163 is conducted, the third resistor $R_3$ and the second resistor $R_2$ are connected with each other in parallel. An end of the third resistor $R_3$ is connected to a reference terminal R of the first three-terminal adjustable voltage regulator 161. The other end of the third resistor $R_3$ is connected to the first terminal 163a of the first switch element 163 such that the third resistor $R_3$ and the first switch element 163 are connected with each other in series. In some embodiment, the locations of the third resistor $R_3$ and the first switch element 163 are exchanged. Under this circumstance, an end of the third resistor $R_3$ is connected to the common terminal COM and the other end of the third resistor $R_3$ is connected to the second terminal 163b of the first switch element 163. That is, the third resistor $R_3$ and the first switch element 163 are also serially connected between both ends of the second resistor $R_2$.

The cathode C of the first three-terminal adjustable voltage regulator 161 is connected to the first connecting node $K_1$. The anode of the first three-terminal adjustable voltage regulator 161 is connected to the common terminal COM. According to the first divided voltage $V_{r1}$ at the reference terminal R of the first three-terminal adjustable voltage regulator 161, the voltage at the first connecting node $K_1$ is selectively adjusted by the first three-terminal adjustable voltage regulator 161. As a consequence, the magnitude of the current inputted into the input terminal of the opto-isolator 164 and the feedback voltage $V_{fb}$ issued from the output terminal of the opto-isolator 164 are varied as the first DC voltage $V_{a1}$.

An end of the fourth resistor $R_4$ is connected to the output terminal of the second rectifier-filter circuit 13b. The other end of the fourth resistor $R_4$ is connected to the reference terminal R of the second three-terminal adjustable voltage regulator 162.

An end of the fifth resistor $R_5$ is connected to the reference terminal R of the second three-terminal adjustable voltage regulator 162. The other end of the fifth resistor $R_5$ is connected to the common terminal COM. That is, the fourth resistor $R_4$ and the fifth resistor $R_5$ are serially connected to the reference terminal R of the second three-terminal adjustable voltage regulator 162. The second DC voltage $V_{a2}$ is subject to voltage division by the serially-connected components $R_4$ and $R_5$, thereby generating a second divided voltage $V_{r2}$.

The anode of the first rectifier diode $D_1$ is connected to the first connecting node $K_1$. The cathode of the first rectifier diode $D_1$ is connected to the cathode C of the second three-terminal adjustable voltage regulator 162 for limiting the current-flowing direction. The anode A of the second three-terminal adjustable voltage regulator 162 is connected to the common terminal COM. According to the second divided voltage $V_{r2}$ at the reference terminal R of the second three-terminal adjustable voltage regulator 162, the voltage at the first connecting node $K_1$ is selectively adjusted by the second three-terminal adjustable voltage regulator 162. As a consequence, the magnitude of the current inputted into the input terminal of the opto-isolator 164 and the feedback voltage $V_{fb}$ issued from the output terminal of the opto-isolator 164 are varied as the second DC voltage $V_{a2}$.

Moreover, the feedback circuit 16 further comprises a first frequency compensation circuit 165a. The first frequency compensation circuit 165a is interconnected between the cathode C and the reference terminal R of the first three-terminal adjustable voltage regulator 161 for improving the stability and the frequency response of the first three-terminal adjustable voltage regulator 161. The first frequency compensation circuit 165a comprises a first compensation capacitor $C_{a1}$, a second compensation capacitor $C_{a2}$ and a first compensation resistor $R_{a1}$. The first compensation capacitor $C_{a1}$ and the first compensation resistor $R_{a1}$ are serially connected between the cathode C and the reference terminal R of the first three-terminal adjustable voltage regulator 161. The second compensation capacitor $C_{a2}$ is individually connected between the cathode C and the reference terminal R of the first three-terminal adjustable voltage regulator 161.

Moreover, the feedback circuit 16 further comprises a second frequency compensation circuit 165b. The second frequency compensation circuit 16b is interconnected between the cathode C and the reference terminal R of the second three-terminal adjustable voltage regulator 162 for improving the stability and the frequency response of the second three-terminal adjustable voltage regulator 162. The second frequency compensation circuit 16b comprises a third compensation capacitor $C_{a3}$, a fourth compensation capacitor $C_{a4}$ and a second compensation resistor $R_{a2}$. The third compensation capacitor $C_{a3}$ and the second compensation resistor $R_{a2}$ are serially connected between the cathode C and the reference terminal R of the second three-terminal adjustable voltage regulator 162. The fourth compensation capacitor $C_{a4}$ is individually connected between the cathode C and the reference terminal R of the second three-terminal adjustable voltage regulator 162.

The first rectifier-filter circuit 13a comprises a third rectifier diode $D_3$ and a first filter capacitor $C_{b1}$. The anode of the third rectifier diode $D_3$ is connected to the first secondary winding assembly $N_{s1}$ of the transformer 11. The cathode of the third rectifier diode $D_3$ is connected to the output terminal of the first rectifier-filter circuit 13a. An end of the first filter capacitor $C_{b1}$ is connected to the output terminal of the first rectifier-filter circuit 13a. The other end of the first filter capacitor $C_{b1}$ is connected to the common terminal COM.

The second rectifier-filter circuit 13b comprises a fourth rectifier diode $D_4$ and a second filter capacitor $C_{b2}$. The anode of the fourth rectifier diode $D_4$ is connected to the second secondary winding assembly $N_{s2}$ of the transformer 11. The cathode of the fourth rectifier diode $D_4$ is connected to the output terminal of the second rectifier-filter circuit 13b. An end of the second filter capacitor $C_{b2}$ is connected to the output terminal of the second rectifier-filter circuit 13b. The other end of the second filter capacitor $C_{b2}$ is connected to the common terminal COM.

An example of each of the power switching circuit 12 and the first switching circuit 14a includes but is not limited to a metal oxide semiconductor field effect transistor (MOSFET) or a bipolar junction transistor (BJT). An example of the first switch element 163 includes but is not limited to a metal oxide semiconductor field effect transistor (MOSFET) or a bipolar junction transistor (BJT). According to the operating mechanism of the power-status signal $V_{ps-on}$, an n-type or p-type MOSFET or an n-type or p-type BJT is used as the first switch element 163.

In this embodiment, the power-status signal $V_{ps-on}$ is at a power-on status when the power-status signal $V_{ps-on}$ is a low-level voltage, and the power-status signal $V_{ps-on}$ is at a power standby status when the power-status signal $V_{ps-on}$ is a high-level voltage. Under this circumstance, the first switch element 163 and the first switching circuit 14a are p-type MOSFETs or p-type BJTs. For example, assuming that the first switch element 163 is a p-type MOSFET, the control terminal, the first terminal 163a and the second terminal 163b of the first switch element 163 correspond to the gate terminal G, the source terminal S and the drain terminal of the p-type MOSFET, respectively. On the other hand, assuming that the first switch element 163 is a p-type BJT, the control terminal, the first terminal 163a and the second terminal 163b of the first switch element 163 correspond to the base B, the emitter E and the collector C of the p-type BJT.

In some embodiments, the power-status signal $V_{ps-on}$ is at a power standby status when the power-status signal $V_{ps-on}$ is a low-level voltage, and the power-status signal $V_{ps-on}$ is at a power-on status when the power-status signal $V_{ps-on}$ is a high-level voltage. Under this circumstance, the first switch element 163 and the first switching circuit 14a are n-type MOSFETs or n-type BJTs. For example, assuming that the first switch element 163 is an n-type MOSFET, the control terminal, the first terminal 163a and the second terminal 163b of the first switch element 163 correspond to the gate terminal G, the drain terminal and the source terminal S of the n-type MOSFET, respectively. On the other hand, assuming that the first switch element 163 is an n-type BJT, the control terminal, the first terminal 163a and the second terminal 163b of the first switch element 163 correspond to the base B, the collector C and the emitter E of the n-type BJT.

Figure 2:
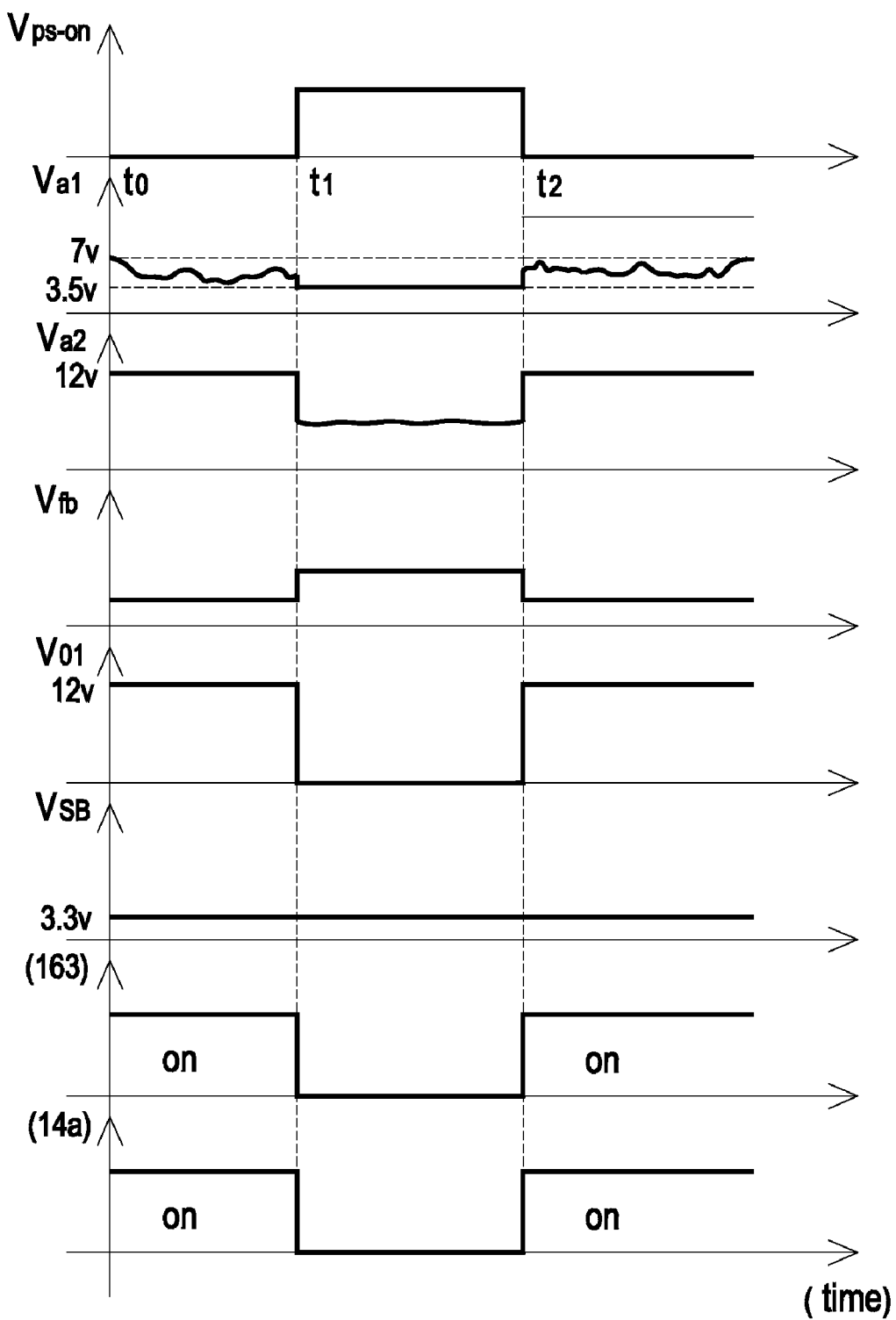
FIG. 2 is a timing waveform diagram schematically illustrating the corresponding voltage signals processed in the power conversion circuit of FIG. 1B and FIG. 1C.

FIG. 2 is a timing waveform diagram schematically illustrating the corresponding voltage signals processed in the power conversion circuit of FIG. 1B and FIG. 1C. Please refer to FIGS. 1B, 1C and 2. From the time spot $t_0$ to the time spot $t_1$, the power-status signal $V_{ps-on}$ is at the power-on status with a low-level voltage. According to the power-on status of the power-status signal $V_{ps-on}$, the first switching circuit 14a is conducted. Meanwhile, the second DC voltage $V_{a2}$ is transmitted to the second output terminal 1B of the power conversion circuit 1 through the first switching circuit 14a. As such, the first output voltage $V_{o1}$ is equal to the second DC voltage $V_{a2}$. Moreover, according to the power-on status of the power-status signal $V_{ps-on}$, the first switch element 163 is also conducted. The relation between the first divided voltage $V_{r1}$ and the first DC voltage $V_{a1}$ is deduced as follows:

$$V_{r1} = \frac{R_2 // R_3}{R_1 + (R_2 // R_3)} \times V_{a1},$$

In addition, the first three-terminal adjustable voltage regulator 161 has a first reference voltage $V_{ref1}$ (e.g. 1.25 volts). Since the first divided voltage $V_{r1}$ is smaller than the first reference voltage $V_{ref1}$, the operation of the first three-terminal adjustable voltage regulator 161 is suspended. According to the second divided voltage $V_{r2}$, the voltage at the first connecting node $K_1$ is selectively adjusted by the second three-terminal adjustable voltage regulator 162. As such, the feedback voltage $V_{fb}$ is varied as the second DC voltage $V_{a2}$. The relation between the second divided voltage $V_{r2}$ and the second DC voltage $V_{a2}$ is deduced as follows:

$$V_{r2} = \frac{R_5}{R_4 + R_5} \times V_{a2} = h_2 \times V_{a2}, \quad \left(h_2 = \frac{R_5}{R_4 + R_5}\right),$$

In addition, the second three-terminal adjustable voltage regulator 162 has a second reference voltage $V_{ref2}$ (e.g. 1.25 volts). The second divided voltage $V_{r2}$ is larger than or equal to the second reference voltage $V_{ref2}$.

When the power-status signal $V_{ps-on}$ is at the power-on status with a low-level voltage, the feedback circuit 16 generates the feedback voltage $V_{fb}$ according to the second DC voltage $V_{a2}$ by using a second feedback parameter $h_2$. Then, the on duration and the off duration of the power switching circuit 12 are controlled by the power control circuit 17 according to the feedback voltage $V_{fb}$. For example, the duty cycle of the power switching circuit 12 is adjusted under control of the power control circuit 17, so that the second DC voltage $V_{a2}$ is maintained at a rated value (e.g. 12 volts). Under this circumstance, the second DC voltage $V_{a2}$ is independent of the electricity consumption of the system circuit 2. Since the relation between the first secondary winding assembly $N_{s1}$ and the second secondary winding assembly $N_{s2}$ of the transformer 11 are fixed after the transformer 11 is fabricated, the first pulse width modulation voltage $V_{PWM1}$ and the second pulse width modulation voltage $V_{PWM2}$ are in a constant proportional relation. If the duty cycle of the second pulse width modulation voltage $V_{PWM2}$ is increased as the electricity consumption of the system circuit 2 is increased, the first pulse width modulation voltage $V_{PWM1}$ is also increased. In other words, the first DC voltage $V_{a1}$ is increased as the electricity consumption of the system circuit 2 is increased. By the voltage-adjusting circuit 15, the magnitude of the first DC voltage $V_{a1}$ is adjusted to the rated standby voltage $V_{SB}$ (e.g. 3.3 volts).

At the time spot $t_1$, the power-status signal $V_{ps\text{-}on}$ is at the power standby status with a high-level voltage, and thus the first switching circuit 14a is shut off. Meanwhile, the second DC voltage $V_{a2}$ fails to be transmitted to the second output terminal 1B of the power conversion circuit 1 through the first switching circuit 14a. As such, the first output voltage $V_{o1}$ is zero. Moreover, according to the power-on status of the power-status signal $V_{ps\text{-}on}$, the first switch element 163 is also shut off. The relation between the first divided voltage $V_{r1}$ and the first DC voltage $V_{a1}$ is deduced as follows:

$$V_{r1} = \frac{R_2}{R_1 + R_2} \times V_{a1} = h_1 \times V_{a1}, \quad \left(h_1 = \frac{R_2}{R_1 + R_2}\right),$$

Since the first divided voltage $V_{r1}$ is larger than or equal to the first reference voltage $V_{ref1}$, the voltage at the first connecting node $K_1$ is selectively adjusted by the first three-terminal adjustable voltage regulator 161 according to the first divided voltage $V_{r1}$. As such, the feedback voltage $V_{fb}$ is varied as the first DC voltage $V_{a1}$. In addition, since the second divided voltage $V_{r2}$ is smaller than the second reference voltage $V_{ref2}$, the operation of the second three-terminal adjustable voltage regulator 162 is suspended.

When the power-status signal $V_{ps\text{-}on}$ is at the power standby status with a high-level voltage, the feedback circuit 16 generates the feedback voltage $V_{fb}$ according to the first DC voltage $V_{a1}$ by using a first feedback parameter $h_1$. Then, the on duration and the off duration of the power switching circuit 12 are controlled by the power control circuit 17 according to the feedback voltage $V_{fb}$. As a consequence, the first DC voltage $V_{a1}$ is maintained at a minimum input voltage value (e.g. 3.5 volts) of the voltage-adjusting circuit 15. Furthermore, the voltage difference between the input terminal and the output terminal of the voltage-adjusting circuit 15 will be maintained at a minimum voltage value (e.g. 0.2 volt). That is, when the power conversion circuit is at the power standby status, the unnecessary power loss consumed by the voltage-adjusting circuit 15 is very tiny.

At the time spot $t_2$, the power-status signal $V_{ps\text{-}on}$ is at the power-on status with a low-level voltage. According to the power-on status of the power-status signal $V_{ps\text{-}on}$, the first switching circuit 14a is conducted. Meanwhile, the second DC voltage $V_{a2}$ is transmitted to the second output terminal 1B of the power conversion circuit 1 through the first switching circuit 14a. As such, the first output voltage $V_{o1}$ is equal to the second DC voltage $V_{a2}$. Moreover, according to the power-on status of the power-status signal $V_{ps\text{-}on}$, the first switch element 163 is also conducted. In addition, the operation of the first three-terminal adjustable voltage regulator 161 is suspended. According to the second divided voltage $V_{r2}$, the voltage at the first connecting node $K_1$ is selectively adjusted by the second three-terminal adjustable voltage regulator 162. As such, the feedback voltage $V_{fb}$ is varied as the second DC voltage $V_{a2}$. Similarly, the feedback circuit 16 generates the feedback voltage $V_{fb}$ according to the second DC voltage $V_{a2}$ by using the second feedback parameter $h_2$. As a consequence, the second DC voltage $V_{a2}$ is maintained at the rated value and the first DC voltage $V_{a1}$ is larger than the minimum input voltage value of the voltage-adjusting circuit 15.

Figure 1D:
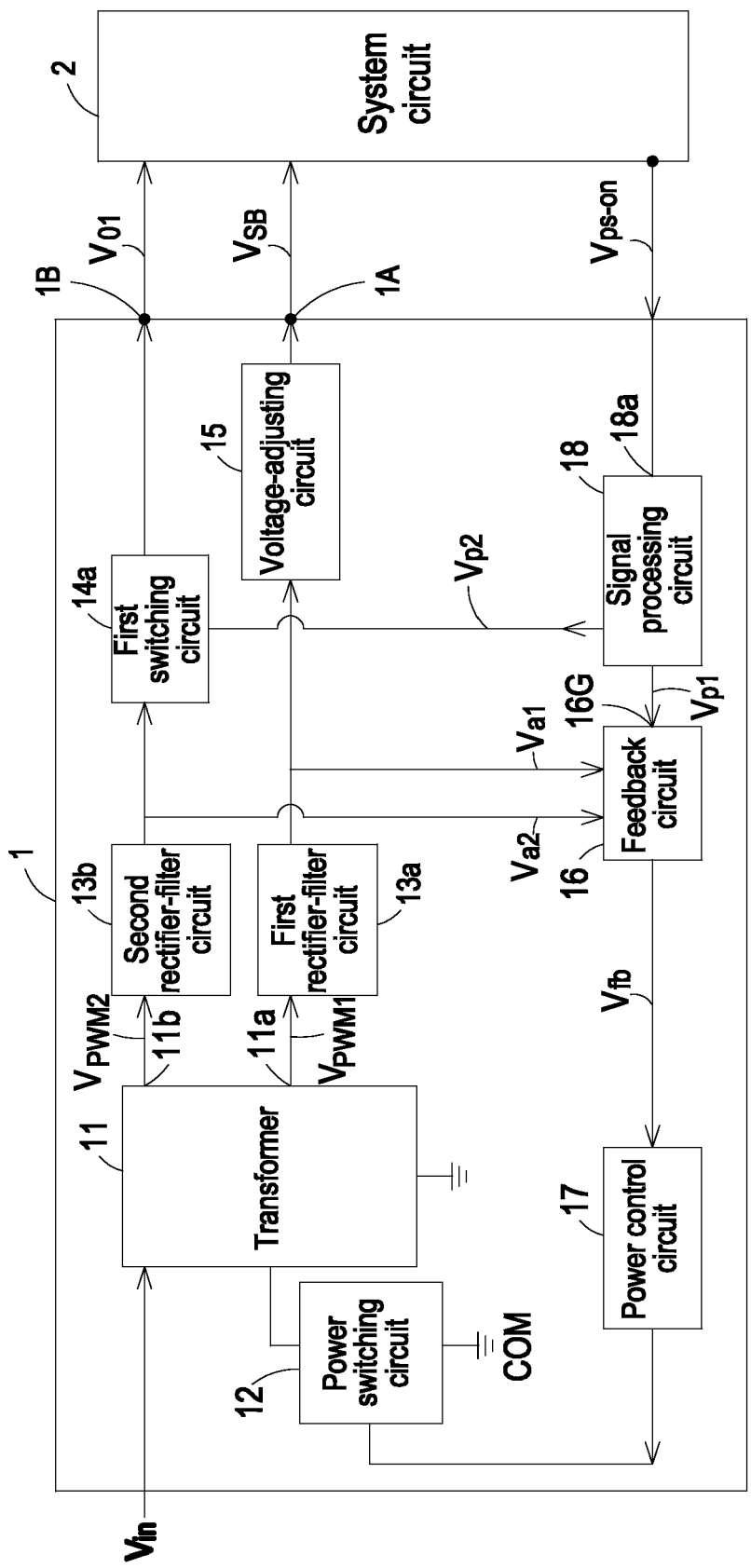
FIG. 1D is a schematic circuit block diagram illustrating a multi-output power conversion circuit according to a second preferred embodiment of the present invention.

FIG. 1D is a schematic circuit block diagram illustrating a multi-output power conversion circuit according to a second preferred embodiment of the present invention. As shown in FIG. 1D, the power conversion circuit 1 principally comprises a transformer 11, a power switching circuit 12, a first rectifier-filter circuit 13a, a second rectifier-filter circuit 13b, a first switching circuit 14a, a voltage-adjusting circuit 15, a feedback circuit 16, a power control circuit 17 and a signal processing circuit 18. The configurations and the operation principles of the transformer 11, the power switching circuit 12, the first rectifier-filter circuit 13a, the second rectifier-filter circuit 13b, the first switching circuit 14a, the voltage-adjusting circuit 15, the feedback circuit 16 and the power control circuit 17 included in the power conversion circuit 1 of FIG. 1D are similar to those shown in FIG. 1A, and are not redundantly described herein. The input terminal of the signal processing circuit 18 is connected to the system circuit 2. In addition, the signal processing circuit 18 is also connected to the feedback circuit 16 and the control terminal of the first switching circuit 14a for processing the power-status signal $V_{ps\text{-}on}$. According to the power-status signal $V_{ps\text{-}on}$, the signal processing circuit 18 generates a first status signal $V_{p1}$ and a second status signal $V_{p2}$ to the feedback circuit 16 and the control terminal of the first switching circuit 14a, respectively.

In this embodiment, the on/off statuses of the feedback circuit 16 and the first switching circuit 14a are not directly controlled according to the power-status signal $V_{ps\text{-}on}$. In particular, the on/off statuses of the feedback circuit 16 and the first switching circuit 14a are respectively controlled according to the first status signal $V_{p1}$ and the second status signal $V_{p2}$, which are issued by the signal processing circuit 18 according to the power-status signal $V_{ps\text{-}on}$. In other words, the on/off statuses of the feedback circuit 16 and the first switching circuit 14a are indirectly controlled according to the power-status signal $V_{ps\text{-}on}$.

Since the on/off statuses of the feedback circuit 16 and the first switching circuit 14a are respectively controlled according to the first status signal $V_{p1}$ and the second status signal $V_{p2}$, the operating mechanisms of the first status signal $V_{p1}$, the second status signal $V_{p2}$ and the power-status signal $V_{ps\text{-}on}$ may be identical or different. For example, the on/off statuses of the feedback circuit 16 and the first switching circuit 14a are controlled according to the signals whose phases are reverse to the power-status signal $V_{ps\text{-}on}$.

For example, if the power-status signal $V_{ps\text{-}on}$ issued by the system circuit 2 is a low-level voltage when the system circuit 2 is at the power standby status but the first switching circuit 14a is shut off according to a high-level voltage, the signal processing circuit 18 generates a high-level second status signal $V_{p2}$ according to the low-level power-status signal $V_{ps\text{-}on}$. In other words, the first switching circuit 14a is indirectly controlled according to the power-status signal $V_{ps\text{-}on}$.

Moreover, if the voltage level of the power-status signal $V_{ps-on}$ is different from the voltage levels of the feedback circuit 16 and the first switching circuit 14*a*, the voltage levels of the first status signal $V_{p1}$, the second status signal $V_{p2}$ and the power-status signal $V_{ps-on}$ may be adjusted by the signal processing circuit 18. For example, if the power-status signal $V_{ps-on}$ of 5 volts is processed by the signal processing circuit 18, the first status signal $V_{p1}$ of 3.3 volts and the second status signal $V_{p2}$ of 12 volts are generated to control operations of the feedback circuit 16 and the first switching circuit 14*a*, respectively.

Figure 1E:
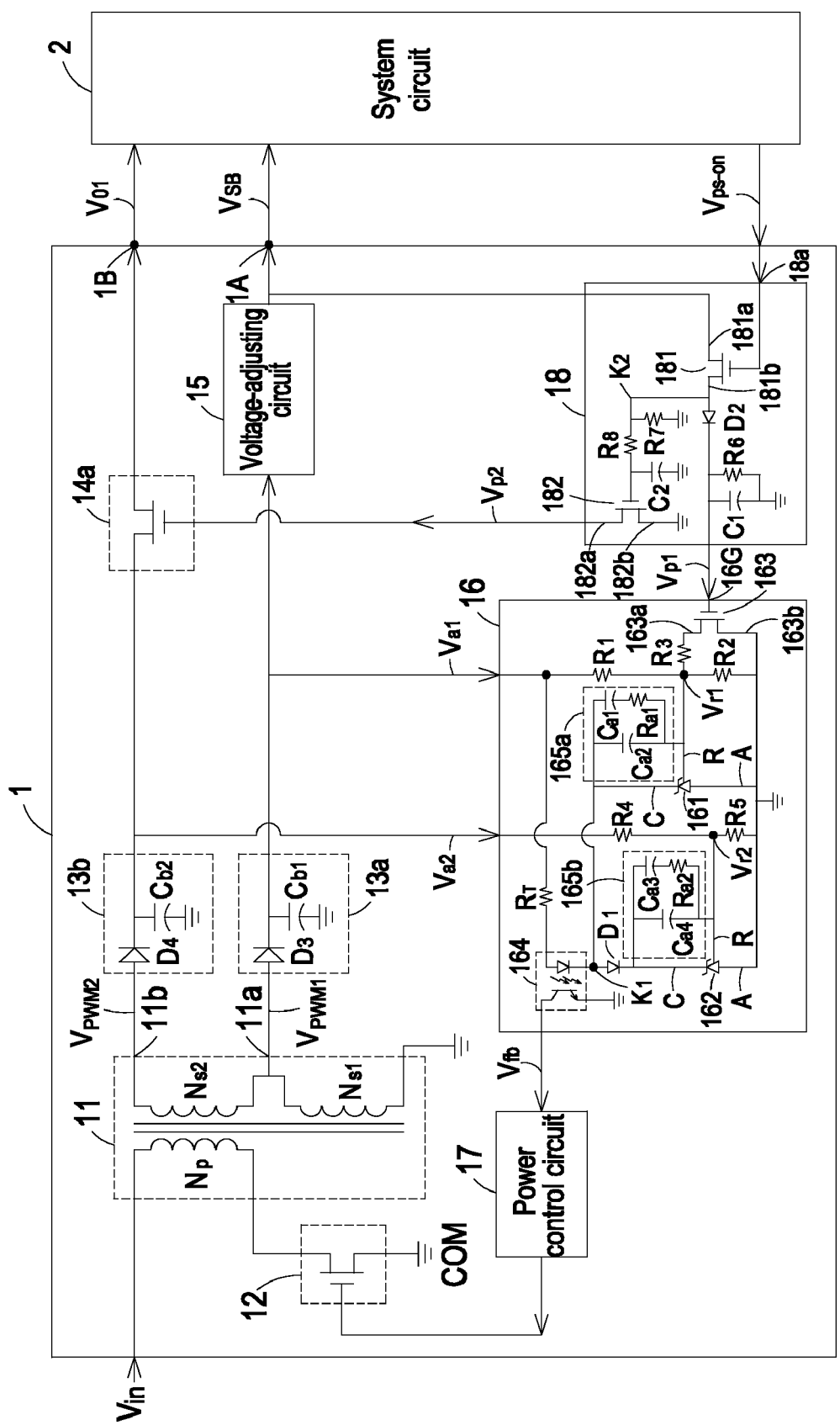
FIG. 1E is a schematic detailed circuit diagram illustrating an exemplary power conversion circuit shown in FIG. 1D.

FIG. 1E is a schematic detailed circuit diagram illustrating an exemplary power conversion circuit shown in FIG. 1D. Please refer to FIGS. 1B, 1D and 1E. In comparison with FIG. 1B, the power conversion circuit 1 of FIG. 1E further includes the signal processing circuit 18 and the feedback circuit 16 is an n-type MOSFET. The signal processing circuit 18 is used for processing the power-status signal $V_{ps-on}$ that is issued by the system circuit 2. According to the power-status signal $V_{ps-on}$, the signal processing circuit 18 generates a first status signal $V_{p1}$ and a second status signal $V_{p2}$ to the feedback circuit 16 and the control terminal of the first switching circuit 14*a*, respectively. The on/off statuses of the feedback circuit 16 and the first switching circuit 14*a* are indirectly controlled according to the power-status signal $V_{ps-on}$.

In this embodiment, the signal processing circuit 18 comprises a second switch element 181, a third switch element 182, a second rectifier diode $D_2$, a first capacitor $C_1$, a second capacitor $C_2$, a sixth resistor $R_6$, a seventh resistor $R_7$ and an eighth resistor $R_8$. The first terminal 181*a* of the second switch element 181 is connected to the output terminal of the voltage-adjusting circuit 15. The second terminal 181*b* of the second switch element 181 is connected to a second connecting node $K_2$. The control terminal of the second switch element 181 is connected to the system circuit 2. The on/off statues of the second switch element 181 are controlled according to the power-status signal $V_{ps-on}$. As a consequence, the phases of the voltage at the second connecting node $K_2$ and the first status signal $V_{p1}$ are opposed to the phase of the power-status signal $V_{ps-on}$.

The anode of the second rectifier diode $D_2$ is connected to the second connecting node $K_2$. The cathode of the second rectifier diode $D_2$ is connected to the control terminal 16G of the feedback circuit 16 for limiting the current-flowing direction. The first capacitor $C_1$ is interconnected between the control terminal 16G of the feedback circuit 16 and the common terminal COM. The sixth resistor $R_6$ is also interconnected between the control terminal 16G of the feedback circuit 16 and the common terminal COM. The first capacitor $C_1$ and the sixth resistor $R_6$ collectively define a first signal delay circuit. The delay time of the first signal delay circuit is determined according to the capacitance value of the first capacitor $C_1$ and the resistance value of the sixth resistor $R_6$.

The first terminal 182*a* of the third switch element 182 is connected to the control terminal of the first switching circuit 14*a*. The second terminal 182*b* of the third switch element 182 is connected to the common terminal COM. The control terminal of the third switch element 182 is connected to an end of the second capacitor $C_2$. An end of the seventh resistor $R_7$ is connected to the second connecting node $K_2$. The other end of the seventh resistor $R_7$ is connected to the common terminal COM. An end of the second capacitor $C_2$ is connected to the control terminal of the third switch element 182. The other end of the second capacitor $C_2$ is connected to the common terminal COM. The eighth resistor $R_8$ is interconnected between the second connecting node $K_2$ and the control terminal of the third switch element 182. The seventh resistor $R_7$, the eighth resistor $R_8$ and the second capacitor $C_2$ collectively define a second signal delay circuit. The delay time of the second signal delay circuit is determined according to the capacitance value of the second capacitor $C_2$ and the resistance values of the seventh resistor $R_7$ and the eighth resistor $R_8$.

In some embodiments, the signal processing circuit 18 further comprises a ninth resistor $R_9$. An end of the ninth resistor $R_9$ is connected to the first terminal 181*a* and the control terminal of the second switch element 181 for improving the stability of the second switch element 181.

Figure 3:
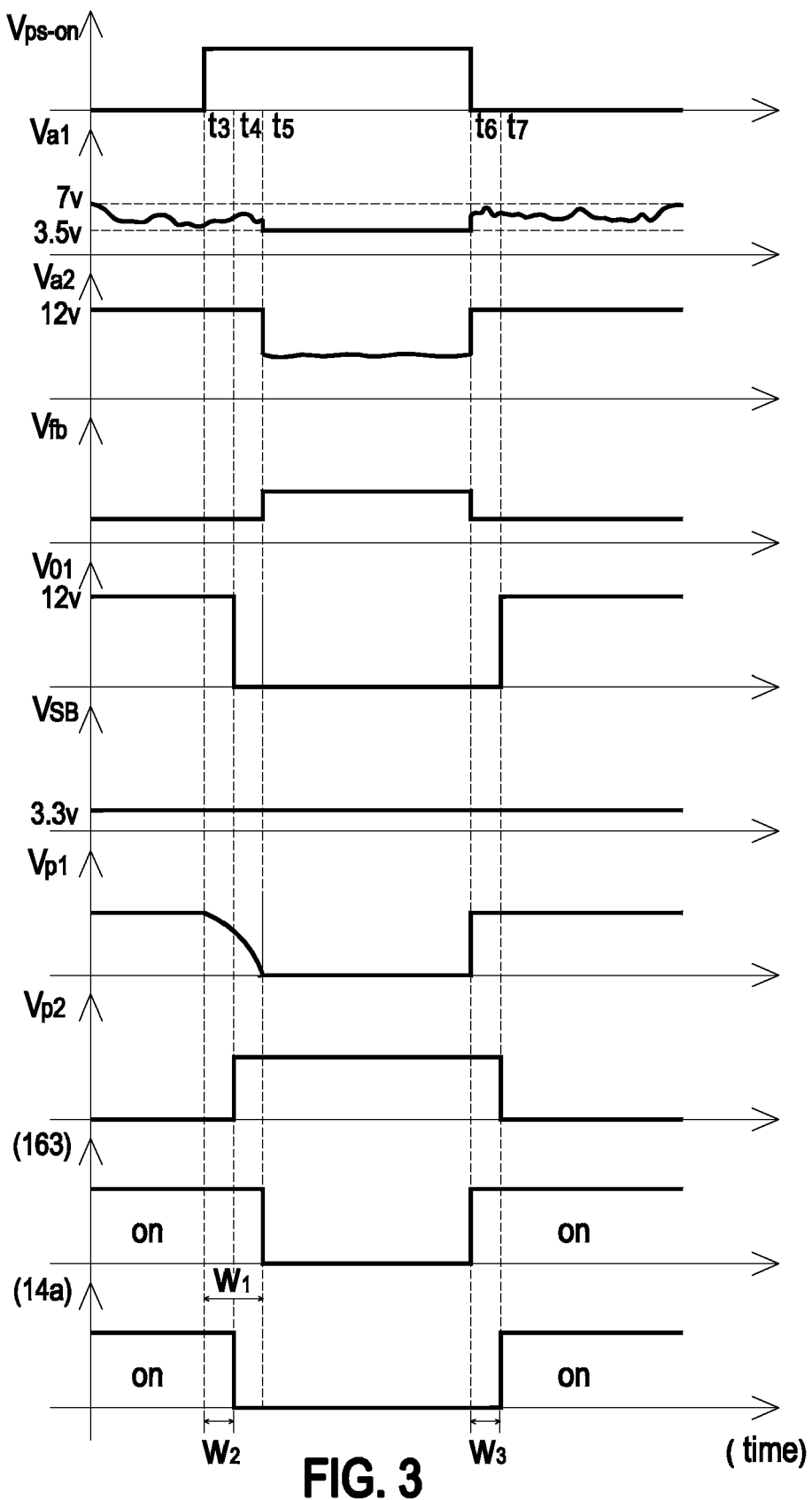
FIG. 3 is a timing waveform diagram schematically illustrating the corresponding voltage signals processed in the power conversion circuit of FIG. 1D and FIG. 1E.

FIG. 3 is a timing waveform diagram schematically illustrating the corresponding voltage signals processed in the power conversion circuit of FIG. 1D and FIG. 1E. Please refer to FIGS. 1D, 1E and 3. Before the time spot $t_3$, the power-status signal $V_{ps-on}$ is at the power-on status with a low-level voltage. According to the power-on status of the power-status signal $V_{ps-on}$, the second switch element 181 is conducted and thus the third switch element 182 is conducted. At the same time, the signal processing circuit 18 generates a first status signal $V_{p1}$ (e.g. a high-level voltage) and a second status signal $V_{p2}$ (a low-level voltage) to the first switch circuit 163 of the feedback circuit 16 and the control terminal of the first switching circuit 14*a*, respectively. As such, the first switch circuit 163 and the first switching circuit 14*a* are conducted. The feedback circuit 16 generates the feedback voltage $V_{fb}$ according to the second DC voltage $V_{a2}$ by using a second feedback parameter $h_2$. Then, the on duration and the off duration of the power switching circuit 12 are controlled by the power control circuit 17 according to the feedback voltage $V_{fb}$. Under control of the power control circuit 17, the second DC voltage $V_{a2}$ is maintained at a rated value (e.g. 12 volts) and transmitted to the second output terminal 1B of the power conversion circuit 1 through the first switching circuit 14*a*.

Likewise, the first pulse width modulation voltage $V_{PWM1}$ and the second pulse width modulation voltage $V_{PWM2}$ are in a constant proportional relation. If the duty cycle of the second pulse width modulation voltage $V_{PWM2}$ is increased as the electricity consumption of the system circuit 2 is increased, the first pulse width modulation voltage $V_{PWM1}$ is also increased. In other words, the first DC voltage $V_{a1}$ is increased as the electricity consumption of the system circuit 2 is increased. By the voltage-adjusting circuit 15, the magnitude of the first DC voltage $V_{a1}$ is adjusted to the rated standby voltage $V_{SB}$ (e.g. 3 volts).

At the time spot $t_3$, the power-status signal $V_{ps-on}$ is at the power standby status with a high-level voltage, and thus the second switch element 181 is shut off. Meanwhile, the first capacitor $C_1$ discharges the stored electric energy through the sixth resistor $R_6$. Due to the first signal delay circuit collectively defined by the first capacitor $C_1$ and the sixth resistor $R_6$, the magnitude of the first status signal $V_{p1}$ is decreased from the high-level voltage to the low-level voltage after a first delay time $w_1$. The first delay time $w_1$ is determined according to the capacitance value of the first capacitor $C_1$ and the resistance value of the sixth resistor $R_6$. Moreover, the second capacitor $C_2$ discharges the stored electric energy through the seventh resistor $R_7$ and the eighth resistor $R_8$. Due to the second signal delay circuit collectively defined by the seventh resistor $R_7$, the eighth resistor $R_8$ and the second capacitor $C_2$, the magnitude of the second status signal $V_{p2}$ is increased from the low-level voltage to the high-level voltage (or high impedance) after a second delay time $w_2$. The second delay time $w_2$ is determined according to the capacitance value of the second capacitor $C_2$ and the resistance values of the seventh resistor $R_7$ and the eighth resistor $R_8$.

At the time spot $t_4$, the discharging operation of the second capacitor $C_2$ is completed and thus the third switch element 182 is shut off. As such, the magnitude of the second status signal $V_{p2}$ is increased from the low-level voltage to the high-level voltage (or high impedance). Meanwhile, the first switching circuit 14a is shut off. Since the second DC voltage $V_{a2}$ fails to be transmitted to the second output terminal 1B of the power conversion circuit 1 through the first switching circuit 14a, the first output voltage $V_{o1}$ is zero.

At the time spot $t_5$, the discharging operation of the first capacitor $C_1$ is completed. As such, the magnitude of the first status signal $V_{p1}$ is decreased from the high-level voltage to the low-level voltage. According to the low-level voltage of the first status signal $V_{p1}$, the first switch circuit 163 is shut off. The feedback circuit 16 generates the feedback voltage $V_{fb}$ according to the first DC voltage $V_{a1}$ by using the first feedback parameter $h_1$. Then, the on duration and the off duration of the power switching circuit 12 are controlled by the power control circuit 17 according to the feedback voltage $V_{fb}$. As a consequence, the first DC voltage $V_{a1}$ is maintained at a minimum input voltage value (e.g. 3.5 volts) of the voltage-adjusting circuit 15. Furthermore, the voltage difference between the input terminal and the output terminal of the voltage-adjusting circuit 15 will be maintained at a minimum voltage value (e.g. 0.2 volt). That is, when the power conversion circuit is at the power standby status, the unnecessary power loss generated by the voltage-adjusting circuit 15 is very tiny.

At the time spot $t_6$, the power-status signal $V_{ps\text{-}on}$ is at the power-on status with a low-level voltage. According to the power-on status of the power-status signal $V_{ps\text{-}on}$, the second switch element 181 is conducted. The magnitude of the first status signal $V_{p1}$ is instantly switched to the high-level voltage without being influenced by the first signal delay circuit. According to the high-level voltage of the first status signal $V_{p1}$, the first switch circuit 163 is conducted. The feedback circuit 16 generates the feedback voltage $V_{fb}$ according to the second DC voltage $V_{a2}$ by using a second feedback parameter $h_2$. Then, the on duration and the off duration of the power switching circuit 12 are controlled by the power control circuit 17 according to the feedback voltage $V_{fb}$. Under control of the power control circuit 17, the second DC voltage $V_{a2}$ is maintained at a rated value (e.g. 12 volts). Under this circumstance, the second DC voltage $V_{a2}$ is independent of the electricity consumption of the system circuit 2 and the first DC voltage $V_{a1}$ is larger than the minimum input voltage value of the voltage-adjusting circuit 15. At the same time, electric energy begins to be charged into the second capacitor $C_2$. The magnitude of the second status signal $V_{p2}$ is decreased from the high-level voltage (or high impedance) to the low-level voltage after a third delay time $w_3$. The third delay time $w_3$ is determined according to the capacitance value of the second capacitor $C_2$ and the resistance value of the eighth resistor $R_8$.

At the time spot $t_7$, the charging operation of the second capacitor $C_2$ is completed and thus the third switch element 182 is conducted. The magnitude of the second status signal $V_{p2}$ is decreased from the high-level voltage (or high impedance) to the low-level voltage. As such, the second DC voltage $V_{a2}$ is maintained at a rated value (e.g. 12 volts) and transmitted to the second output terminal 1B of the power conversion circuit 1 through the first switching circuit 14a.

Figure 4A:
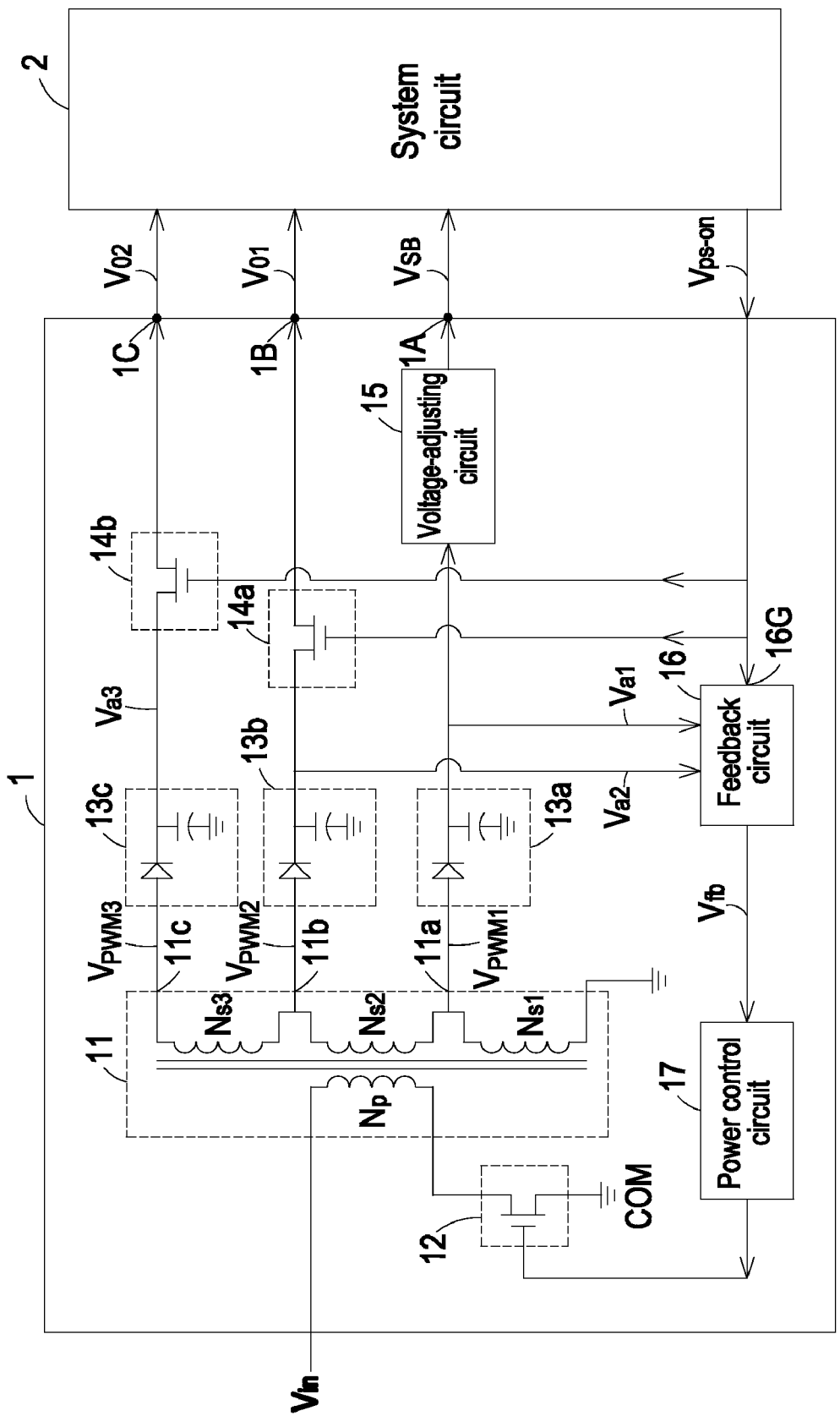
FIG. 4A is a schematic circuit block diagram illustrating a multi-output power conversion circuit according to a third preferred embodiment of the present invention.

FIG. 4A is a schematic circuit block diagram illustrating a multi-output power conversion circuit according to a third preferred embodiment of the present invention. The configurations and the operation principles of the power switching circuit 12, the first rectifier-filter circuit 13a, the second rectifier-filter circuit 13b, the first switching circuit 14a, the voltage-adjusting circuit 15, the feedback circuit 16 and the power control circuit 17 included in the power conversion circuit 1 of FIG. 4A are similar to those shown in FIG. 1A, and are not redundantly described herein. The power conversion circuit 1 of FIG. 4A further comprises a third rectifier-filter circuit 13c and a second switching circuit 14b. In addition, the transformer 11 further comprises a third secondary winding assembly $N_{s3}$, which is connected to a third secondary connecting terminal 11c of the transformer 11. The input terminal of the third rectifier-filter circuit 13c is connected to the third secondary connecting terminal 11c of the transformer 11. The output terminal of the third rectifier-filter circuit 13c is connected to the input terminal of the second switching circuit 14b. The third rectifier-filter circuit 13c is used for rectifying and filtering a third pulse width modulation voltage $V_{PWM3}$, thereby generating a third DC voltage $V_{a3}$.

The second switching circuit 14b is interconnected between the third rectifier-filter circuit 13c and the third output terminal 1C of the power conversion circuit 1. The control terminal of the second switching circuit 14b is connected to the system circuit 2. According to the power-status signal $V_{ps\text{-}on}$, the second switching circuit 14b is selectively conducted or shut off. In a case that the power-status signal $V_{ps\text{-}on}$ is at the power standby status with a high-level voltage, the second switching circuit 14b is shut off and thus the third DC voltage $V_{a3}$ fails to be transmitted to the third output terminal 1C of the power conversion circuit 1 through the second switching circuit 14b. As such, the second output voltage $V_{o2}$ to be transmitted from the third output terminal 1C of the power conversion circuit 1 is zero. Whereas, in a case that the power-status signal $V_{ps\text{-}on}$ is at the power-on status with a low-level voltage, the second switching circuit 14b is conducted and thus the third DC voltage $V_{a3}$ is transmitted to the third output terminal 1C of the power conversion circuit 1 through the second switching circuit 14b. Under this circumstance, the second output voltage $V_{o2}$ to be transmitted from the third output terminal 1C of the power conversion circuit 1 is equal to the third DC voltage $V_{a3}$.

Figure 4B:
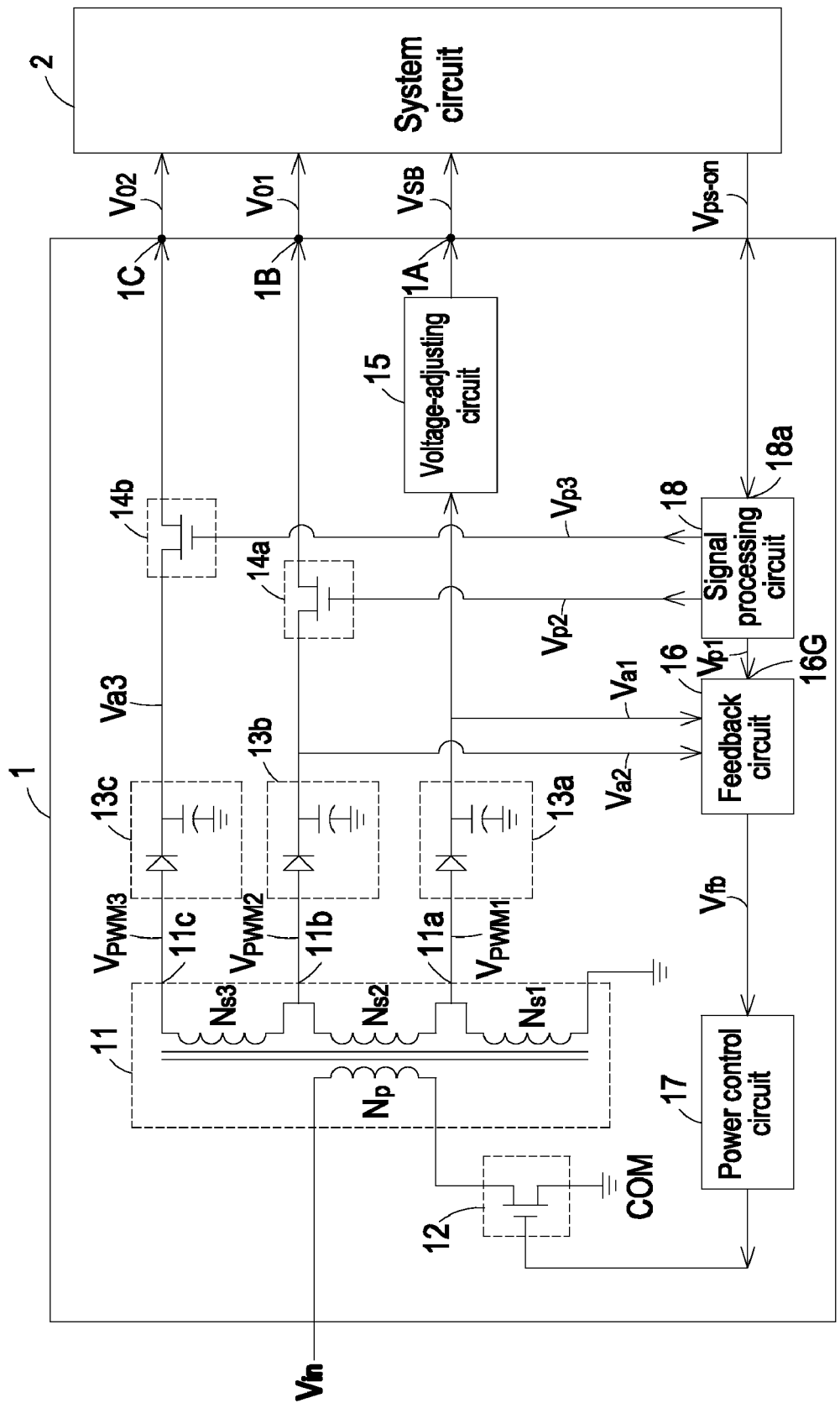
FIG. 4B is a schematic circuit block diagram illustrating a multi-output power conversion circuit according to a fourth preferred embodiment of the present invention.

FIG. 4B is a schematic circuit block diagram illustrating a multi-output power conversion circuit according to a fourth preferred embodiment of the present invention. In comparison with FIG. 4A, the power conversion circuit 1 of FIG. 4B further comprises a signal processing circuit 18. The input terminal of the signal processing circuit 18 is connected to the system circuit 18. In addition, the signal processing circuit 18 is also connected to the feedback circuit 16, the first switching circuit 14a and the second switching circuit 14b for processing the power-status signal $V_{ps\text{-}on}$. According to the power-status signal $V_{ps\text{-}on}$, the signal processing circuit 18 generates a first status signal $V_{p1}$, a second status signal $V_{p2}$ and a third status signal $V_{p3}$ to the feedback circuit 16, the first switching circuit 14a and the second switching circuit 14b, respectively. As a consequence, the on/off statuses of the feedback circuit 16, the first switching circuit 14a and the second switching circuit 14b are indirectly controlled according to the power-status signal $V_{ps\text{-}on}$.

The operations of the power conversion circuit of FIG. 4B are similar to those of FIG. 1D. The third status signal $V_{p3}$ is identical to the second status signal $V_{p2}$. According to the second status signal $V_{p2}$ and the third status signal $V_{p3}$, the first switching circuit 14a and the second switching circuit 14b are simultaneously conducted or shut off. In some embodiments, the signal processing circuit 18 only generates the first status signal $V_{p1}$ and the second status signal $V_{p2}$. The control terminals of the first switching circuit 14a and the second switching circuit 14b are both connected to a common output terminal (not shown) of the signal processing circuit 18. According to the second status signal $V_{p2}$, the first switching circuit 14a and the second switching circuit 14b are simultaneously conducted or shut off.

From the above description, according to the power-status signal, the feedback circuit may selectively generates the feedback voltage according to the first DC voltage by using a first feedback parameter or generates the feedback voltage according to the second DC voltage by using a second feedback parameter. As a result, the magnitude of the first DC voltage and the second DC voltage of the power conversion circuit of the present invention can be selectively controlled according to the power-status signal. When the power-status signal is at a power standby status, the voltage difference between the input terminal and the output terminal of the voltage-adjusting circuit is maintained at a minimum input voltage value. As a consequence, the unnecessary power loss consumed by the voltage-adjusting circuit is very tiny and the efficiency of the power conversion circuit is enhanced. In addition, the running time of the electronic appliance having the present power conversion circuit is extended. Moreover, since the power conversion circuit of the present invention has a single transformer and a power control circuit, the overall volume is reduced but the power density is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-output power conversion circuit for converting an input voltage into a standby voltage and a first output voltage, said standby voltage and said first output voltage being transmitted to a system circuit through a first output terminal and a second output terminal, respectively, said multi-output power conversion circuit comprising:
   a transformer comprising a primary winding assembly, a first secondary winding assembly and a second secondary winding assembly;
   a power switching circuit connected to said primary winding assembly of said transformer and a common terminal;
   a first rectifier-filter circuit connected to said first secondary winding assembly of said transformer for rectification and filtering off noise, thereby generating a first DC voltage;
   a second rectifier-filter circuit connected to said second secondary winding assembly of said transformer for rectification and filtering off noise, thereby generating a second DC voltage;
   a first switching circuit interconnected between said second rectifier-filter circuit and said second output terminal of said multi-output power conversion circuit;
   a voltage-adjusting circuit interconnected between said first rectifier-filter circuit and said first output terminal of said multi-output power conversion circuit;
   a feedback circuit connected to said first rectifier-filter circuit, said second rectifier-filter circuit and said system circuit, wherein said feedback circuit generates a feedback voltage according to a power-status signal issued by said system circuit; and
   a power control circuit interconnected between said power switching circuit and said feedback circuit for controlling on/off statuses of said power switching circuit according to said feedback voltage, wherein said feedback circuit generates said feedback voltage according to said power-status signal and selectively according to said first DC voltage or said second DC voltage.

2. The multi-output power conversion circuit according to claim 1 wherein when said power-status signal is at a power standby status, the on duration and the off duration of said power switching circuit are controlled by said power control circuit such that said first DC voltage is maintained at a minimum input voltage value of said voltage-adjusting circuit, and when said power-status signal is at a power-on status, the on duration and the off duration of said power switching circuit are controlled by said power control circuit such that said second DC voltage is maintained at a rated value.

3. The multi-output power conversion circuit according to claim 1 wherein when said power-status signal is at a power standby status, said feedback circuit generates said feedback voltage according to said first DC voltage by using a first feedback parameter, and when said power-status signal is at a power-on status, said feedback circuit generates said feedback voltage according to said second DC voltage by using a second feedback parameter.

4. The multi-output power conversion circuit according to claim 1 wherein a control terminal of said first switching circuit is connected to said system circuit, and said first switching circuit is conducted or shut off according to said power-status signal.

5. The multi-output power conversion circuit according to claim 4 wherein said first switching circuit is conducted when said power-status signal is at a power-on status, and said first switching circuit is shut off when said power-status signal is at a power standby status.

6. The multi-output power conversion circuit according to claim 1 wherein said first secondary winding assembly and said second secondary winding assembly of said transformer are connected with each other in series.

7. The multi-output power conversion circuit according to claim 1 wherein said first secondary winding assembly is connected to a first secondary connecting terminal of said transformer for generating a first pulse width modulation voltage, and said second secondary connecting terminal is connected to a second secondary connecting terminal of said transformer for generating a second pulse width modulation voltage.

8. The multi-output power conversion circuit according to claim 7 wherein said second pulse width modulation voltage is larger than said first pulse width modulation voltage.

9. The multi-output power conversion circuit according to claim 1 wherein said feedback circuit comprises:
   an opto-isolator having an output terminal connected to said power control circuit;
   a current-limiting resistor serially connected with an input terminal of said opto-isolator between said first rectifier-filter circuit and a first connecting node;
   a first three-terminal adjustable voltage regulator having a cathode connected to said first connecting node and an anode connected to said common terminal;
   a first rectifier diode having an end connected to said first connecting node;
   a second three-terminal adjustable voltage regulator having a cathode connected to said first rectifier diode and an anode connected to said common terminal;
   a first resistor having an end connected to an output terminal of said first rectifier-filter circuit and the other end connected to a reference terminal of said first three-terminal adjustable voltage regulator;

a second resistor having an end connected to said reference terminal of said first three-terminal adjustable voltage regulator and the other end connected to said common terminal;

a first switch element having a control terminal connected to a control terminal of said feedback circuit;

a third resistor serially connected with said first switch element between both ends of said second resistor;

a fourth resistor having an end connected to an output terminal of said second rectifier-filter circuit and the other end connected to a reference terminal of said second three-terminal adjustable voltage regulator; and a fifth resistor having an end connected to said reference terminal of said second three-terminal adjustable voltage regulator and the other end connected to said common terminal, wherein the magnitude of the voltage at said first connecting node is indirectly adjusted by said first three-terminal adjustable voltage regulator or said second three-terminal adjustable voltage regulator according to said first DC voltage or said second DC voltage, so that said feedback voltage is issued from an output terminal of said opto-isolator according to said first DC voltage or said second DC voltage.

10. The multi-output power conversion circuit according to claim 9 wherein said first switch element is shut off when said power-status signal is at a power standby status, and said first switch element is conducted when said power-status signal is at a power-on status.

11. The multi-output power conversion circuit according to claim 9 wherein said feedback circuit further comprises a first frequency compensation circuit interconnected between said cathode and said reference terminal of said first three-terminal adjustable voltage regulator.

12. The multi-output power conversion circuit according to claim 9 wherein said feedback circuit further comprises a second frequency compensation circuit interconnected between said cathode and said reference terminal of said second three-terminal adjustable voltage regulator.

13. The multi-output power conversion circuit according to claim 1 further comprising a signal processing circuit, which is connected to a control terminal of said feedback circuit, a control terminal of said first switching circuit and said system circuit for processing said power-status signal, wherein said signal processing circuit generates a first status signal and a second status signal to said feedback circuit and said control terminal of said first switching circuit for respectively controlling operations of said feedback circuit and said first switching circuit, and said feedback circuit and said first switching circuit are indirectly controlled according to the power-status signal.

14. The multi-output power conversion circuit according to claim 13 wherein said signal processing circuit comprises:

a second switch element having a first terminal connected to an output terminal of said voltage-adjusting circuit, a second terminal connected to a second connecting node and a control terminal connected to said system circuit, wherein said second switch element is conducted or shut off according to said power-status signal;

a second rectifier diode having an anode connected to said second connecting node and a cathode connected to a control terminal of said feedback circuit for limiting the current-flowing direction;

a first capacitor interconnected between said control terminal of said feedback circuit and said common terminal;

a sixth resistor interconnected between said control terminal of said feedback circuit and said common terminal;

a third switch element having a first terminal connected to an control terminal of said first switching circuit and a second terminal connected to said common terminal;

a second capacitor interconnected between said control terminal of said third switch element and said common terminal;

a seventh resistor having an end connected to said second connecting node and the other end connected to said common terminal; and an eighth resistor interconnected between said second connecting node and said control terminal of said third switch element.

15. The multi-output power conversion circuit according to claim 14 wherein said first capacitor and said sixth resistor collectively define a first signal delay circuit, and a delay time of said first signal delay circuit is determined according to the capacitance value of said first capacitor and the resistance value of said sixth resistor.

16. The multi-output power conversion circuit according to claim 14 wherein said seventh resistor, said eighth resistor and said second capacitor collectively define a second signal delay circuit, and a delay time of said first signal delay circuit is determined according to the capacitance value of said second capacitor and the resistance values of said seventh resistor and said eighth resistor.

17. The multi-output power conversion circuit according to claim 14 wherein said signal processing circuit further comprises a ninth resistor, which is interconnected between said first terminal and said control terminal of said second switch element.

18. The multi-output power conversion circuit according to claim 1 wherein said power switching circuit and said first switching circuit are metal oxide semiconductor field effect transistors or bipolar junction transistors.

19. The multi-output power conversion circuit according to claim 1 wherein said control circuit is a pulse width modulation controller or a digital signal processor.

20. The multi-output power conversion circuit according to claim 1 wherein said transformer further comprises a third secondary winding assembly, and said multi-output power conversion circuit further comprises:

a third rectifier-filter circuit connected to said third secondary winding assembly of said transformer for rectification and filtering off noise, thereby generating a third DC voltage; and a second switching circuit interconnected between said third rectifier-filter circuit and a third output terminal of said multi-output power conversion circuit, wherein said second switching circuit is conducted or shut off according to said power-status signal.

* * * * *